INVENTOR
Richard L. Tremaine.
BY O. B. Buchanan
ATTORNEY

United States Patent Office 2,917,672
Patented Dec. 15, 1959

2,917,672

LOSS-OF-FIELD RELAYS

Richard L. Tremaine, Export, Pa., assignor to Westinghouse Electric Corporation, East Pittsburgh, Pa., a corporation of Pennsylvania Application August 11, 1953, Serial No. 373,616

16 Claims. (Cl. 317—13)

My invention relates to loss-of-field relays for protecting synchronous machines against either a complete loss of field or any other dangerous under-excitation-condition. And when I speak of protecting a synchronous machine, I contemplate also the protection of the line or system to which the machine is connected, wherever such protection is necessary.

The nature of the loss-of-field phenomenon, and the status of the art concerning protective measures therefor, are indicated in a number of technical papers, including: Concordia and Temoshok, 1947 AIEE Transactions, pages 1512–1518; Crary and McClure, Electrical World, June 30, 1952, pages 65–69; Crossman, Lindemuth and Webb, 1942 AIEE Transactions, pages 261–266 and 462–463; Committee Report, 1951 AIEE Proceedings, volume 70, part 1, pages 275–281, particularly Lischer's discussion, page 281; Michelson and Lischer, 1948 AIEE Transactions, pages 1–9; and Mason, 1949 AIEE Transactions, pages 1240–1245.

It is an object of my present invention to provide a novel means for giving the operator or station-attendant a more prompt warning that the protected machine is beginning to operate, with insufficient excitation, beyond its designed-capability, so that the operator will have as much time as possible to restore excitation to the machine, if this can be done before it becomes necessary to disconnect the machine from the system, thus avoiding an unnecessary unscheduled machine-outage, or system-instability.

Figure 1:
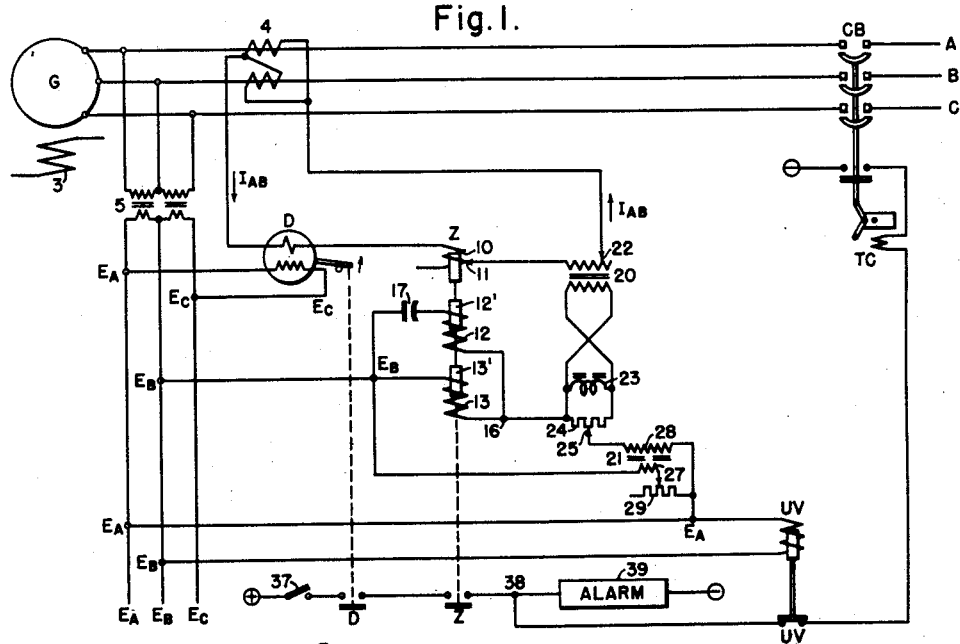
Figure 2:
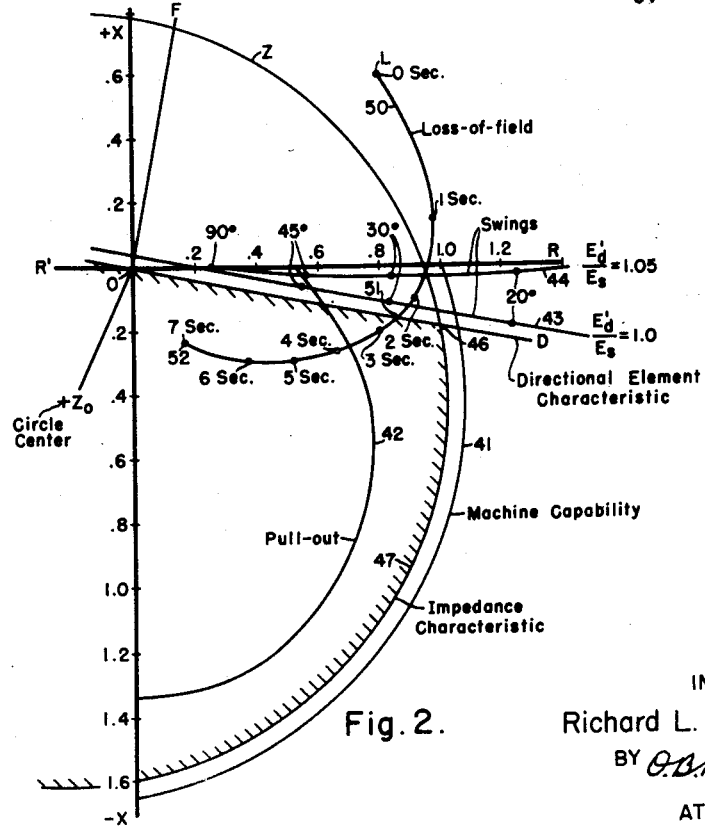

With the foregoing and other objects in view, my invention consists in the systems, combinations, machines, parts and methods of design and operation, hereinafter described, and illustrated in the accompanying drawing, wherein:

Fig. 1 is a simplified diagrammatic view of circuits and apparatus illustrating the principles of my invention; and Fig. 2 is a curve-diagram which will be referred to in the explanation.

I have shown my invention as being applied for the protection of a synchronous machine G, having a field winding 3. This machine G will ordinarily be a turbine generator, which would have a round-rotor field-member, although the machine G may sometimes be a water wheel generator or other synchronous machine having a salient-pole field-member. Certain features of my invention are also applicable to the protection of synchronous condensers. The protected synchronous generator G is shown as being connected to a three-phase line or system A, B, C, through a circuit breaker CB which has a trip coil TC.

My protective equipment is illustrated as comprising three relay-means or elements, which may be referred to, for convenience, as a directional relay-means D, a modified-impedance relay-means Z, and an undervoltage relay-means UV. It should be understood, however, that each of these means or elements could be replaced by an element which might perhaps have a different name, but which would perform an equivalent element-function in the combination, as will be understood from the subsequent description. It should also be understood that each relay-means or element does not need to be separate and complete in itself, independent of any other relay-means or element, but different connections or adjustments of a single element (not shown) might be used successively to cause the element to perform two or more successive functions, as the dangerous operating-conditions of the synchronous machine progress or develop.

I have shown the use of line-current transformers 4 and potential-transformers 5, connected in or to the machine-terminals or the line-conductors of the line or system to which the synchronous machine is connected, for supplying the delta relaying-current $I_{AB}$ and the relaying voltages $E_A$, $E_B$ and $E_C$. The various voltage-coils of the relaying equipment are shown as being connected, delta-fashion, to different pairs of the derived line-voltages $E_A$, $E_B$, $E_C$. It should be understood, however, that I could have used line-to-neutral currents and voltages, instead of these delta quantities.

The first relay-means which I have chosen for illustration is a simple high-speed directional element D, which responds to a predetermined direction of current-flow, to close a make-contact which is also marked D. The convention of using the same reference-character to indicate both the operating-mechanism and the contact-members of a relay is used to indicate that the two parts belong to the same mechanism. The directional element D is illustrated as having a current-coil which responds to the line-current $I_{AB}$, and a voltage-coil which responds to the line-voltage $E_{AC}$.

The second illustrated relay-element or means is a modified impedance relay Z, having a current-responsive operating-coil 10, with adjustable taps 11, and two out-of-phase voltage-and-current-responsive restraining-coils 12 and 13. The current-responsive operating-coil 10 is responsive to the line-current $I_{AB}$, and tends to close the make-contact Z of the relay, while the voltage-and-current-responsive restraint-coils 12 and 13 tend to restrain this operation. These two restraint-coils 12 and 13 operate on separate armatures or magnetic circuits 12' and 13', respectively. Electrically, the two restraint-coils 12 and 13 are connected in parallel with each other, between the $E_B$ terminal and a conductor 16, with a dephasing impedance, such as a capacitor 17, in series with one of the coils, 12, so as to produce a steady restraining force, as is well known.

There are a number of available forms of modified impedance relays, in which the impedance circle of the relay is adjustable as to radius, displacement of its center from the origin, and angle of displacement. The impedance relay Z which has been chosen for illustration is that which is shown in the Goldsborough Patent 2,393,983, with a phase-shifter as shown in the Carlin Patent 2,495,158. Other forms of modified impedance relays include those shown in the Goldsborough Patents 2,386,209; 2,404,955; 2,425,735 and 2,426,013; the Sonnemann Patents 2,425,759 and 2,426,062; and the Lenehan Patent 2,426,033.

The electrical energizing-connections for the modified impedance relay Z include an auxiliary current-transformer 20 and a mutual reactor 21. The auxiliary current-transformer 20 is energized by the derived line-current $I_{AB}$, and it is provided with adjustable primary taps 22. The secondary winding of the auxiliary current-transformer 20 energizes a phase-shifting compensator-network consisting of an inductance 23 and a parallel-connected resistance 24 which is provided with adjustable potentiometer-taps 25.

The mutual reactor 21 is provided with a primary winding 27 and a secondary winding 28 which has from 2 to 2.5 times as many turns as the primary winding, as explained in the previously mentioned Carlin Patent 2,495,158. The primary winding 27 is connected in series with a variable resistance 29, and this primary circuit is energized across the terminals $E_B$ and $E_A$. One terminal of the secondary winding 28 is connected to the terminal $E_A$, while its other terminal is connected to the potentiometer-tap 25 of the current-compensator resistance 24, this resistance being in turn connected, at one of its terminals, to the common connection 16 of the two restraint-coils 12 and 13 of the modified impedance element Z.

As explained in the Carlin patent, the compensator-resistance 24 is preferably negligibly small, compared to the relatively large impedances of the restraint-coils 12 and 13 of the impedance relay Z; and the relay-impedance of the two restraint-coils 12 and 13 is at least approximately commensurate with the impedance of the secondary winding 28 of the mutual reactor 21. It is usually adequate for the primary-circuit resistance 29 to be variable between a minimum value of about 1.7 times the inductive reactance of the primary winding 27, and an infinite or very large resistance-value, which would correspond to an open-circuited adjustment of the primary resistance 29.

My third relay-element is illustrated as a simple under-voltage-relay UV, having an operating coil, which is energized with the delta voltage $E_{AB}$, which is obtained across the two voltage-terminals $E_A$ and $E_B$. The under-voltage-relay UV has a back-contact UV, which closes when the line-voltage $E_{AB}$ drops to a predetermined percentage of its normal value.

Suitable response-means or control-circuits are provided, for performing various controlling functions in response to the operation of the several relay-elements D, Z and UV. Thus, starting with a positive battery-terminal (+), a control-circuit is provided, which serially contains a manually operable control-switch 37, and the make-contacts D and Z, for energizing a control-circuit conductor 38. This control-circuit conductor 38 has two branches connected to it, one of which energizes an alarm 39, while the other branch is connected, through the UV back-contact, to the trip coil TC of the circuit breaker CB.

The adjustment, the operation, and the suggested uses of the above-described equipment, which is shown in Fig. 1, will best be explained with reference to Fig. 2, in which the apparent machine-impedances or load-impedances are plotted on impedance-coordinates OR and (+X)O(−X), representing line-resistance and line-reactance. Real loads which the line draws from the machine are represented by positive values of the load-resistance R, which is calibrated in per-unit values in Fig. 2. Inductive loads are presented by positive values of X, corresponding to lagging-power-factor load-conditions. Capacitive load-currents are represented by negative values of X, corresponding to leading-power-factor load-conditions.

In Fig. 2, I have shown a curve 41, representing the designed or intended capability of the protected machine, in the leading load-direction. This curve means that the load-impedance, in the leading direction, has reached the minimum impedance-value for safe operation, without running the risk of overheating or otherwise damaging the protected machine. It does not represent the static pull-out limits of the machine, which are shown by a curve 42 of considerably smaller radius than the curve 41 of Fig. 2. This static pull-out curve 42 represents the steady-state stability-limit of the machine, or the point at which it will commence to irrevocably swing out of step or out of synchronism with the line or system to which it is connected. If the protected machine has automatic voltage-regulation (not shown), this pull-out courve 42 might be considered as showing the limit of dynamic stability.

In Fig. 2, I have also shown a directional-element characteristic, in the form of a curve OD, which lies in the second and fourth quadrants, at a small angle of 10°, more or less, below the OR axis in the fourth quadrant. This line OD can be considered as being at right angles, or approximately at right angles, to the fault-line OF, which represents the impedance-angle of the line-or-system-impedance.

In Fig. 2, I have also shown two typical swing-curves 43 and 44, which may be regarded as representing typical manners of variation of the apparent impedance of the machine-load, when the protected machine swings with respect to the system, as a result of a system-disturbance such as a fault. Actually, what amounts to the same thing, these swing-curves 43 and 44 are plotted to illustrate the varying load-impedances at the machine, while the machine is operating with normal excitation and is in the process of swinging with respect to an assumed infinite bus which is connected to the machine through an assumed 20% external-reactance, assuming two different values, 1.0 and 1.05, for the ratio $E_d'/E_s$ of the transient or internal voltage $E_d'$ of the machine to the system-voltage $E_s$ of the bus. The angles between the machine-voltage $E_d'$ and the system voltage $E_s$ are indicated at various points along the swing-curves 43 and 44 of Fig. 2, to illustrate the progress of the swing, when the protected machine is changing position with respect to an imaginary infinitely large machine representing the infinite bus, with normal excitation.

The swing-curves 43 and 44 of Fig. 2 represent the usual or normal expected generator-conditions, in which the internal generator-voltage $E_d'$ is either equal to, or slightly larger than, the system for line-voltage $E_s$. It is possible, although not usual, to operate a protected machine with a lower internal voltage $E_d'$ than the system-voltage $E_s$, in which case the ratio $E_d'/E_s$ will be less than unity, and the swing-curve would fall below the unity-ratio curve 43 in Fig. 2.

In whatever position may fall the lowermost expectable out-of-step swing curve, such as 43 or 44 or any variation thereof or the swing-curve having the most leading reactance, it is desirable to provide a relay-element which will block out responses to such swing-conditions in the connected system. In other words, it is desirable that my first relay-means D (which I have shown and designated as a directional element, to give it a convenient name), should have a response-characteristic curve, such as OD, which lies closely displaced on the leading-reactance side of (that is, underneath) the most-leading-reactance swing-curve which would be expected to occur with sufficient frequency, for example the curve 43, which represents the changes in the apparent load-impedance on the machine. Such a relay-curve OD may be regarded as representing the response-characteristics of a modified impedance relay, which is characterized by having a characteristic curve in the form of a circle which can be adjusted to have any desired radius, and any desired position of the circle-center. One of the extreme limits of such a modified impedance relay is a directional element, such as the illustrated directional element D, in which the impedance-circle characteristic is a straight line OD, representing an impedance-circle having an infinite radius.

While, therefore, I have chosen a directional element D for my first relay-element, I wish it to be understood that this element is only illustrative of various equivalent devices which could be used with the same effect of blocking out responses to normal swings between the protected machine and the system. It will be noted, in Fig. 2, that the illustrated directional-element response-curve is a straight line OD, passing through the origin O, and lying slightly below, or on the leading-reactance side of, the unity-ratio swing-line 43.

As previously mentioned, it is also desirable for my first relay-element D to have a directional response-characteristic OD which is at right angles to the line-impedance OF. This has the advantage of blocking out responses to all normal generator-power operating-conditions, and especially blocking out responses to external-fault conditions, existing above the line OD, in which it is not necessary to disconnect the protected machine from the system. Either one or both of these design-characteristics of the first relay-element D may be built into this relay, that is, operating as a directional element having a straight-line response-characteristic which passes approximately through the origin O at an angle which is at approximately right angles to the line-impedance OF; or the response-characteristic could be determined solely by the position of the lowermost expectable swing-curve, such as the curves 43 and 44; or the characteristic could be adjusted to satisfy both of these conditions, that is, to exclude all unwanted responses.

In accordance with my invention, my second relay-element Z should have an impedance-circle characteristic Z (Fig. 2), having a leading-power-factor portion 46—47, or the like, which approximates, plus or minus, the leading-power-factor portion of the machine-capability curve 41, at least in the region likely to be used. It is frequently desirable to provide a certain margin of safety, and make the Z-curve fall just within the capability curve 41, at least in the region where leading-power-factor operation might occur, as will be subsequently explained more in detail. To this end, it is not necessary that the impedance-circle Z should be concentric with the corresponding portion of the machine-capability curve 41, as any impedance-curve Z which approximates the capability-curve 41 would be usable, so as to obtain the maximum margin with respect to the pull-out curve 42. Since, however, one of the principal objects of my invention is to obtain as early a warning as possible, in the event of dangerous operating-conditions which might lead up to a pull-out condition if corrective measures are not most promptly taken, it is very desirable for the Z-curve to be as large as practicable, at least within some such region as the arc 46—47 which lies immediately below the intersection between the Z-curve and the directional-characteristic line OD, within the probable limits of steady-state conditions which might occur on the system.

In the impedance-circle Z which is chosen, for illustrative purposes, in Fig. 2, the circle-center $Z_0$ is at approximately the center of curvature of the capability-curve 41 in the critical region 46 to 47, and the impedance-circle has a radius which is slightly smaller than the corresponding portion of the capability-curve 41. This is intended only for illustrative purposes, and not as a quantative limit of my invention. The circle-center $Z_0$ of the impedance-circle Z, in accordance with my invention, will usually be displaced somewhere below the origin O, or in the direction of leading reactance-loads therefrom, and it may lie either in the third or fourth quadrant, or on the negative portion of the X-axis.

Referring to both Figs. 1 and 2, the characteristics of the impedance response-circle Z in Fig. 2 may be adjusted, in the apparatus shown in Fig. 1, in the following manner. The radius of the impedance-circle is adjusted by adjusting the strength or pull of the operating coil 10, as by means of the taps 11. The circle-center displacement $OZ_0$ in Fig. 2 may be adjusted, as to its length, by a combination of the auxiliary-transformer taps 22 and the compensator-resistor taps 25, one of which can give a coarse adjustment, while the other gives a fine adjustment. The circle-center angle of displacement $R'OZ_0$ in Fig. 2 can be adjusted, within necessary limits, by an adjustment of the primary-circuit resistance 29 in Fig. 1, the R' point representing any negative value of the line-resistance R.

In Fig. 2, I have also shown a rather severe typical loss-of-field impedance-curve 50, which shows the progress of development of the condition, and which has been calculated with the use of a number of simplifying assumptions for a particular machine and particular system-conditions. While it is not intended to be quantitatively exact, this loss-of-field curve 50 is nevertheless believed to be typical or indicative of one of the manners in which the load-impedance of a generator may change from an assumed full-load value L, when the generator starts to pull out of step as a result of a sudden complete loss of its excitation-voltage.

It takes a certain amount of time for a machine to pull out of step after a complete loss of field, while its apparent load-impedance is changing in some such manner as is indicated by the curve 50 in Fig. 2. Typical time-values have been indicated on this curve. Actually, it would be possible for the time-values to be somewhat smaller than those indicated, although usually it is expectable that the time-values will be somewhat longer. The result of a loss of field is to cause the generator or other protected machine G to begin to feed increasing negative reactive currents into the system which is connected to the generator, pulling down the terminal voltage of the machine. Thus, at successive times along the curve 50 in Fig. 2, the generator-voltage is decreasing.

Thus, when the loss-of-field curve 50 intersects the directional-element curve OD at 51, after a time of something like 2.5 seconds after the loss of field, the generator voltage will still be fairly high, say 85–90%. At this point, my improved protective relaying equipment will sound an alarm. The operator will have somewhat over 5 seconds, in the case which is illustrated by the loss-of-field curve 50 in Fig. 2, before the machine slips the first pole, which is just beyond the 7-second point 52. Meanwhile, the system-voltage and the machine-voltage will have become still lower.

Other loss-of-field curves (not shown) could result from different operating conditions and different system-impedances. If the machine had been operating at a similar power factor, with a smaller kv.-a. load than the assumed initial point L, this point would have been further out from the origin O, and the loss-of-field impedance-curve 50 would have been proportionately larger, and it would have been slower in arriving at the pull-out point, corresponding to the point 52. These loss-of-field curves may enter the shaded pick-up zone in Fig. 2, either at some point along the directional-relay line OD or at some point along impedance-relay curve 46—47. All other operating conditions will result in initial points in either the first or fourth quadrants, although generally in the first quadrant, and again will result in loss-of-field curves which enter the shaded pick-up zone either along the line OD, or 46—47.

In view of the fact that normal operating conditions on the majority of systems, and normal swing-conditions, generally lie above the line OD, which may be a curve of an impedance relay with a very large radius, detection of a loss-of-field condition would be possible, using only the relay-means D to sound an alarm, and additionally using the undervoltage relay-means UV to trip.

If the protected synchronous generator or motor is controlled by a regulator (not shown) which is equipped with a minimum-excitation unit or equivalent, the load-impedance of the machine will never enter the zone included by the machine-capability curve 41 in Fig. 2, and normally it will be prevented from even approaching this curve very closely. In the event of a failure of the minimum-excitation feature, however, or under manual operation, the load-impedance can approach this machine-capability area 41. Certain system-engineers might consider any close approach to the capability-curve 41 to be a hazardous operating-condition for their systems, and it is a feature of my invention that the impedance-circle Z can be set with a sufficiently large radius, larger than the radius of the capability-curve 41 in the region 46—47, so as to sound an alarm, or perform other desired relay-response functions, in the event of operation in this region. Such a high setting of the impedance-relay means Z will result in an earlier warning of a loss of field, when the loss-of-field impedance-curves enter the shaded area on the impedance-relay line 46—47 below the directional-relay line OD.

Thus it can be seen that various combinations and adjustments of the three relay-means D, Z and UV may be used, to trip the machine and/or sound one or more alarms. It will further be seen that the combination of the two relay-means D and UV alone, is equivalent to the three-relay combination, where the radius of the modified-impedance relay-means Z is very large or infinite.

Still other loss-of-field curves (not shown) could result from a gradual lowering of the excitation of the machine to an unsafe value, without a complete loss of the field or excitation, thus gradually bringing the operating-conditions into the neighborhood of the capability-curve 41, generally in the region 46—47. In such cases, the generator would not pull out of step, but would be in danger of an excessive temperature-rise. Since the operator would now know that the field is dangerously low, he could correct this condition before the machine is damaged or becomes unstable. My invention provides a means for alerting the operator to the dangerous underexcitation-condition, so that he can correct this condition before excessive heating has been produced in the machine.

My invention is applicable, generally speaking, in one form or another, to all kinds of synchronous machines, whether large or small, although I have chosen to discuss the invention more particularly in connection with turbine generators.

There are two objects to be achieved, with this loss-of-field protection. One is to protect the generator from operating beyond its capability in the leading-power-factor zone, and the other is to protect the system, in the event that there is a more complete, or an absolutely complete, loss of excitation.

Complete or severe loss-of-field will not damage a machine for a number of minutes, but it can cause instability in the system. Low or light partial loss-of-excitation will not usually cause instability in the system, but if not corrected in a reasonable time, it will cause excessive heating in the machine.

If the generator or other synchronous machine is small in comparison to the system, there is little danger to the system, from a loss of field in the machine, and the protection of the machine would be the primary object of any loss-of-field protection which was used; but such protection would not often be needed, because a reasonably proficient operator has abundant time to disconnect the machine manually, before any damage is done to the machine.

If the machine is large in comparsion to the system, or if the generators of the system are closely linked together, as in metropolitan systems, a loss-of-field condition in the machine will pull down the bus-voltage of the system, and if this voltage-drop goes far enough it will cause instability between other synchronous machines on the system. In such a case, the loss-of-field protection is needed principally for the protection of the system.

For any system, it may be determined, by tests or calculation, how much the generator-voltage can be reduced before the other machines in the system will show signs of instability, for desired load-conditions. The undervoltage relay UV would then be set slightly above this value. Typical undervoltage values for this purpose would run from 60 to 90% of the normal voltage, or from 0.6 to 0.9 per-unit voltage, more or less.

If something happens to make the machine suddenly lose all or a part of its field, or if the operator reduces the field on his machine to such a point that the machine is operating beyond its capability, or within the capability-curve 41 in the leading direction, the Z and D elements will pick up and sound an alarm, thus warning the operator of this dangerous operating-condition before the machine loses stability. If the operator is unable to increase the excitation, the impedance will still further decrease. If the machine is large in comparison with the system, the bus-voltage will also drop materially. Actually, it is usually true that a machine operating in excess of its design-capability will still be stable: there will be a certain amount of time before the machine becomes instable.

It is not until the machine-voltage or the system-voltage has reduced to a certain critical value which is usually predeterminable for the system, that there is substantial danger of the system pulling apart at some other point, because of the loss of field or other underexcitation-condition of any particular synchronous machine on the system. Thus, it is possible, when the alarm-part of my protective relaying equipment has determined that any particular machine is at fault in the matter of loss of field or underexcitation, to use the undervoltage relay UV, as has been done in other loss-of-field protective systems, to determine the point at which the stability of the system as a whole will be jeopardized, and it is not until this point is reached, that the machine at fault should or must be automatically tripped out of operation. Another alarm (not shown) could be given at this point, according to the requirements of any particular system, but this would not generally be good practice.

Thus, if the machine loses its excitation and there is danger of instability between other machines in the system (as indicated by a predetermined drop in system-voltage), the machine will be removed automatically. On the other hand, if there is no danger of instability between other machines, the operator can attempt to restore the field on the machine, or if this is not possible he can trip it manually, since minutes will pass before there is an excessive temperature-rise.

An important feature of my invention is the provision of two relay-responsive control-circuits or components, one of which determines that the field-conditions are not normal, while the other component automatically trips out the machine in the event that a dangerously low bus-voltage occurs while there is still an indication of abnormal field-conditions. I believe that my novel combination of a directional element and a modified impedance-relay element, or their equivalents, constitutes an improved means for quickly determining the existence of abnormal underexcitation field-conditions, affording an indication of such conditions in a quicker time than has been possible with any preceding loss-of-field relaying equipments, and under conditions not formerly detectable.

While my invention is particularly applicable to turbine generators, where the need for it is very great, it is also applicable to water wheel generators. My invention, in some of its forms, is also applicable to synchronous condensers, which can operate at zero excitation; but when so applied, the alarm 39 would usually have to be cut out, so that automatic tripping would be obtained only in the event that a critical undervoltage condition occurred simultaneously with the underexcitation condition.

It will be noted that my use of a directional element D, with a properly tilted angle of response, in combination with a modified impedance relay Z and an under-voltage relay UV, prevents tripping on a swing-condition of the protected machine with respect to the system, at least until the protected machine has slipped more than one pole, after which a tripping of the machine will not be objectionable.

While I have discussed impedance relays as if they had circular response-characteristics, when plotted on rectangular coordinates of line-resistance R and line-reactance X, and while this is generally approximately true, I am aware that impedance relays can be designed, in which only a portion of their response-characteristic approximates the form of an arc of a circle. In applications of my invention, it is only the impedance-circle portion which falls in the fourth quadrant, which is essential to the operation, and usually only a small part of this fourth-quadrant portion of the circle, as represented by the arc between the points 46 and 47 in Fig. 2, or some such points. Some impedance-responsive devices may slightly depart from a circular response-characteristic in the presence of abnormally lowered line-voltages, but these slight departures will not cause improper operation of this invention.

While I have shown my invention in only a single form of embodiment, and while I have discussed it primarily in connection with synchronous turbine generators, I wish it to be understood that I am not limited by this illustration or this explanation. In particular, I believe that my invention embraces the substitutions of various equivalent elements for the various means-elements which I have used in combination, and that various changes of omission and addition can be made without departing from the essential spirit of the invention.

I claim as my invention:

1. The combination with a synchronous machine adapted to be connected to an alternating-current line, of:

A first relay-means, adapted to be energized in response to line current and voltage conditions, and having a directional type of characteristic, such as to block a response to substantially all normal generator-power conditions and external-fault conditions;

A second relay-means, adapted to be energized in response to line voltage conditions, and responding to a predetermined drop in a line voltage condition;

A first response-means for performing a first predetermined function in response to a response of said first relay-means; and A second response-means for performing a second predetermined function in response to a joint response to both of said first and second relay-means.

2. The combination with a synchronous machine adapted to be connected to an alternating-current line, of:

A first relay-means, adapted to be energized in response to line current and voltage conditions, and having a directional type of characteristic, such as to block a response to substantially all normal generator-power conditions and external-fault conditions;

A second relay-means, adapted to be energized in response to line current and voltage conditions, and having a modified-impedance type of characteristic curve, having a leading-power-factor portion which approximates a portion of a circle having its circle-center displaced on the leading-reactance side of the origin of impedance-coordinates representing line-resistance and line-reactance;

A third relay-means, adapted to be energized in response to line voltage conditions, and responding to a predetermined drop in a line voltage condition;

A first response-means for performing a first predetermined function in response to a joint response of the first two of said relay-means; and A second response-means for performing a second predetermined function in response to a joint response of all three of said relay-means.

3. The combination with a synchronous machine which is to be protected, of a protective means for quickly responding to terminal conditions indicative of a dangerous underexcitation-condition; said protective means comprising:

A first relay-means, having a response-characteristic curve which lies closely displaced on the leading-reactance side of the most-leading-reactance swing-curve of the machine-impedance, when said curves are plotted on impedance-coordinates of line-resistance and line-reactance;

A second relay-means, responsive to a drop in a terminal voltage to a value low enough to represent approximately the lowest voltage compatible with expectable system-stability;

A first response-means for performing a first predetermined function in response to a response of said first relay-means; and A second response-means for performing a second predetermined function in response to a joint response to both of said first and second relay-means.

4. The combination with a synchronous machine which is to be protected, of a protective means for quickly responding to terminal conditions indicative of a dangerous underexcitation-condition; said protective means comprising:

A first relay-means, having a response-characteristic curve which lies closely displaced on the leading-reactance side of the most-leading-reactance swing-curve of the machine-impedance, when said curves are plotted on impedance-coordinates of line-resistance and line-reactance;

A second relay-means, having a modified-impedance characteristic curve, having a leading-power-factor portion which approximates the machine-capability curve;

A third relay-means, responsive to a drop in a terminal voltage to a value low enough to represent approximately the lowest voltage compatible with expectable system-stability;

A first response-means for performing a first predetermined function in response to a joint response of the first two of said relay-means; and A second response-means for performing a second predetermined function in response to a joint response of all three of said relay-means.

5. The combination with a synchronous machine which is to be protected, of a protective means for quickly responding to terminal conditions indicative of a dangerous underexcitation-condition; said protective means comprising:

A first relay-means, having a directional type of characteristic curve having a fourth-quadrant portion lying slightly below the X-axis, in a line inclining downwardly, in the region of leading power factors, from the neighborhood of the origin, when plotted on impedance-coordinates of line-resistance and line-reactance of a system of a type to which the protected synchronous machine is adapted to be connected, said first relay-means blocking substantially all impedance-responses above said inclined line;

A second relay-means, having a modified-impedance characteristic curve, having a leading-power-factor por- which approximates the machine-capability curve; and A response-means for performing a predetermined function in response to a joint response of both of said first and second relay-means.

6. The combination with a synchronous machine which is to be protected, of a protective means for quickly responding to terminal conditions indicative of a dangerous underexcitation-condition; said protective means comprising:

A first relay-means, having a directional type of characteristic curve having a fourth-quadrant portion lying slightly below the X-axis, in a line inclining downwardly, in the region of leading power factors, from the neighborhood of the origin, when plotted on impedance-coordinates of line-resistance and line-reactance of a system of a type to which the protected synchronous machine is adapted to be connected, said first relay-means blocking substantially all impedance-responses above said inclined line;

A second voltage relay-means, responsive to a drop in a terminal voltage to a value low enough to represent approximately the lowest voltage compatible with expectable system-stability; and A response-means for performing a predetermined function in response to a joint response of both of said first and second relay-means.

7. The combination with a synchronous machine which is to be protected, of a protective means for quickly responding to terminal conditions indicative of a dangerous underexcitation-condition; said protective means comprising:

A first relay-means, having a directional type of characteristic curve having a fourth-quadrant portion lying slightly below the X-axis, in a line inclining downwardly, in the region of leading power factors, from the neighborhood of the origin, when plotted on impedance-coordinates of line-resistance and line-reactance of a system of a type to which the protected synchronous machine is adapted to be connected, said first relay-means blocking substantially all impedance-responses above said inclined line;

A second relay-means, having a modified-impedance characteristic curve, having a leading-power-factor portion which approximates the machine-capability curve;

A third relay-means, responsive to a drop in a terminal voltage to a value low enough to represent approximately the lowest voltage compatible with expectable system-stability; and A response-means for performing a predetermined function in response to a joint response of all three of said relay-means.

8. The combination with a synchronous machine which is to be protected, of a protective means for quickly responding to terminal conditions indicative of a dangerous underexcitation-condition; said protective means comprising:

A first relay-means, having a directional type of characteristic curve having a fourth-quadrant portion lying slightly below the X-axis, in a line inclining downwardly, in the region of leading power factors, from the neighborhood of the origin, when plotted on impedance-coordinates of line-resistance and line-reactance of a system of a type to which the protected synchronous machine is adapted to be connected, said first relay-means blocking substantially all impedance-responses above said inclined line;

A second relay-means, responsive to a drop in a terminal voltage to a value low enough to represent approximately the lowest voltage compatible with expectable system-stability;

A first response-means for performing a first predetermined function in response to a response of said first relay-means; and A second response-means for performing a second predetermined function in response to a joint response to both of said first and second relay means.

9. The combination with a synchronous machine which is to be protected, of a protective means for quickly responding to terminal conditions indicative of a dangerous underexcitation-condition; said protective means comprising:

A first relay-means, having a directional type of characteristic curve having a fourth-quadrant portion lying slightly below the X-axis, in a line inclining downwardly, in the region of leading power factors, from the neighborhood of the origin, when plotted on impedance-coordinates of line-resistance and line-reactance of a system of a type to which the protected synchronous machine is adapted to be connected, said first relay-means blocking substantially all impedance-responses above said inclined line;

A second relay-means, having a modified-impedance characteristic curve, having a leading-power-factor portion which approximates the machine-capability curve;

A third relay-means, responsive to a drop in a terminal voltage to a value low enough to represent approximately the lowest voltage compatible with expectable system-stability;

A first response-means for performing a first predetermined function in response to a joint response of the first two of said relay-means; and A second response-means for performing a second predetermined function in response to a joint response of all three of said relay-means.

10. The combination with a synchronous machine which is to be protected, of a protective means for quickly responding to terminal conditions indicative of a dangerous underexcitation-condition; said protective means comprising:

A first relay-means, having a directional type or characteristic which is at least capable of blocking substantially all impedance-responses on the lagging-reactance side of an approximately straight line which passes approximately through the origin at approximately right angles to the system-impedance line, when plotted on impedance-coordinates of line-resistance and line-reactance of a system of a type to which the protected synchronous machine is adapted to be connected;

A second relay-means, having a modified-impedance characteristic curve, having a leading-power-factor portion which approximates the machine-capability curve; and A response-means for performing a predetermined function in response to a joint response of both of said first and second relay-means.

11. The combination with a synchronous machine which is to be protected, of a protective means for quickly responding to terminal conditions indicative of a dangerous underexcitation-condition; said protective means comprising:

A first relay-means, having a directional type of characteristic which is at least capable of blocking substantially all impedance-responses on the lagging-reactance side of an approximately straight line which passes approximately through the origin at approximately right angles to the system-impedance line, when plotted on impedance-coordinates of line-resistance and line-reactance of a system of a type to which the protected synchronous machine is adapted to be connected;

A second voltage relay-means, responsive to a drop in a terminal voltage to a value low enough to represent approximately the lowest voltage compatible with expectable system-stability; and A response-means for performing a predetermined function in response to a joint response of both of said first and second relay-means.

12. The combination with a synchronous machine which is to be protected, of a protective means for quickly responding to terminal conditions indicative of a dangerous underexcitation-condition; said protective means comprising:

A first relay-means, having a directional type of characteristic which is at least capable of blocking substantially all impedance-responses on the lagging-reactance side of an approximately straight line which passes approximately through the origin at approximately right angles to the system-impedance line, when plotted on impedance-coordinates of line-resistance and line-reactance of a system of a type to which the protected synchronous machine is adapted to be connected;

A second relay-means, having a modified-impedance characteristic curve, having a leading-power-factor portion which approximates the machine-capability curve;

A third relay-means, responsive to a drop in a terminal voltage to a value low enough to represent approximately the lowest voltage compatible with expectable system-stability; and A response-means for performing a predetermined function in response to a joint response of all three of said relay means.

13. The combination with a synchronous machine which is to be protected, of a protective means for quickly responding to terminal conditions indicative of a dangerous underexcitation-condition; said protective means comprising:

A first relay-means, having a directional type of characteristic which is at least capable of blocking substantially all impedance-responses on the lagging-reactance side of an approximately straight line which passes approximately through the origin at approximately right angles to the system-impedance line, when plotted on impedance-coordinates of line-resistance and line-reactance of a system of a type to which the protected synchronous machine is adapted to be connected;

A second relay-means, responsive to a drop in a terminal voltage to a value low enough to represent approximately the lowest voltage compatible with expectable system-stability;

A first response-means for performing a first predetermined function in response to a response of said first relay-means; and A second response-means for performing a second predetermined function in response to a joint response to both of said first and second relay-means.

14. The combination with a synchronous machine which is to be protected, of a protective means for quickly responding to terminal conditions indicative of a dangerous underexcitation-condition; said protective means comprising:

A first relay-means, having a directional type of characteristic which is at least capable of blocking substantially all impedance-responses on the lagging-reactance side of an approximately straight line which passes approximately through the origin at approximately right angles to the system-impedance line, when plotted on impedance-coordinates of line-resistance and line-reactance of a system of a type to which the protected synchronous machine is adapted to be connected;

A second relay-means, having a modified-impedance characteristic curve, having a leading-power-factor portion which approximates the machine-capability curve;

A third relay-means, responsive to a drop in a terminal voltage to a value low enough to represent approximately the lowest voltage compatible with expectable system-stability;

A first response-means for performing a first predetermined function in response to a joint response of the first two of said relay-means; and A second response-means for performing a second predetermined function in response to a joint response of all three of said relay-means.

15. The combination with a synchronous machine which is to be protected, of a protective means for quickly responding to terminal conditions indicative of a dangerous underexcitation-condition; said protective means comprising:

A first relay-means, having a response-characteristic curve having a fourth-quadrant portion which is at all points substantially as high as an approximately straight line which passes approximately through the origin at approximately right angles to the system-impedance line, said fourth-quadrant portion also lying at all points closely below the group of curves representing expectable out-of-step swing-curves of the machine-impedance when there is expectable instability between other synchronous machines on the system to which the protected synchronous machine is adapted to be connected, under various expectable operating-conditions, when said curves are plotted on impedance-coordinates of line-resistance and line-reactance;

A second relay-means, responsive to a drop in a terminal voltage to a value low enough to represent approximately the lowest voltage compatible with expectable system-stability;

A first response-means for performing a first predetermined function in response to a response of said first relay-means; and A second response-means for performing a second predetermined function in response to a joint response to both of said first and second relay-means.

16. The combination with a synchronous machine which is to be protected, of a protective means for quickly responding to terminal conditions indicative of a dangerous underexcitation-condition; said protective means comprising:

A first relay-means, having a response-characteristic curve having a fourth-quadrant portion which is at all points substantially as high as an approximately straight line which passes approximately through the origin at approximately right angles to the system-impedance line, said fourth-quadrant portion also lying at all points closely below the group of curves representing expectable out-of-step swing-curves of the machine-impedance when there is expectable instability between other synchronous machines on the system to which the protected synchronous machine is adapted to be connected, under various expectable operating-conditions, when said curves are plotted on impedance-coordinates of line-resistance and line-reactance;

A second relay-means, having a modified-impedance characteristic curve, having a leading-power-factor portion which approximates the machine-capability curve;

A third relay-means, response to a drop in a terminal voltage to a value low enough to represent approximately the lowest voltage compatible with expectable system-stability; :

A first response-means for performing a first predetermined function in response to a joint response of the first two of said relay-means; and A second response-means for performing a second predetermined function in response to a joint response of all three of said relay-means.

References Cited in the file of this patent

UNITED STATES PATENTS

| | | |
|---|---|---|
| 2,425,735 | Goldsborough | Aug. 19, 1947 |
| 2,425,759 | Sonnemann | Aug. 19, 1947 |
| 2,509,025 | Warrington | May 23, 1950 |
| 2,523,771 | Mason | Sept. 26, 1950 |
| 2,525,485 | Harder | Oct. 10, 1950 |
| 2,584,765 | Warrington | Feb. 5, 1952 |
| 2,655,646 | Callahan | Oct. 13, 1953 |
| 2,728,071 | Sikorra | Dec. 20, 1955 |